(12) United States Patent
Cutler et al.

(10) Patent No.: US 9,977,432 B1
(45) Date of Patent: May 22, 2018

(54) DISTRIBUTED FLIGHT CONTROL SYSTEM

(71) Applicant: Kitty Hawk Corporation, Mountain View, CA (US)

(72) Inventors: Mark Johnson Cutler, Sunnyvale, CA (US); Todd Reichert, Mountain View, CA (US); James Jackson, San Jose, CA (US)

(73) Assignee: Kitty Hawk Corporation, Mountain View, CA (US)

( * ) Notice: Subject to any disclaimer, the term of this patent is extended or adjusted under 35 U.S.C. 154(b) by 0 days. days.

(21) Appl. No.: 15/388,627

(22) Filed: Dec. 22, 2016

(51) Int. Cl.
*G05D 1/08* (2006.01)
*G05D 1/10* (2006.01)
*B64C 27/08* (2006.01)
*B64C 39/02* (2006.01)

(52) U.S. Cl.
CPC ............. *G05D 1/0833* (2013.01); *G05D 1/08* (2013.01); *G05D 1/085* (2013.01); *G05D 1/0808* (2013.01); *G05D 1/0816* (2013.01); *G05D 1/101* (2013.01); *B64C 27/08* (2013.01); *B64C 39/024* (2013.01); *B64C 2201/024* (2013.01); *B64C 2201/141* (2013.01)

(58) Field of Classification Search
CPC ...... G05D 1/08; G05D 1/0808; G05D 1/0816; G05D 1/0833; G05D 1/085; G05D 1/101
See application file for complete search history.

(56) References Cited

U.S. PATENT DOCUMENTS

| | | | | |
|---|---|---|---|---|
| 4,472,780 A | * | 9/1984 | Chenoweth et al. | G05D 1/0077 244/194 |
| 4,649,484 A | * | 3/1987 | Herzong et al. | B64C 13/503 244/194 |
| 5,493,497 A | * | 2/1996 | Buus | B64C 13/503 244/194 |
| 7,708,229 B1 | | 5/2010 | Angle, II | |
| 7,840,316 B2 | * | 11/2010 | Yount | G05D 1/0061 244/194 |
| 8,033,509 B2 | * | 10/2011 | Yount et al. | B64C 13/42 244/194 |
| 2004/0098140 A1 | | 5/2004 | Hess | |
| 2006/0043242 A1 | * | 3/2006 | Benson | B64C 13/503 244/175 |
| 2007/0007385 A1 | * | 1/2007 | Potter | B64C 13/503 244/53 R |
| 2007/0008673 A1 | | 1/2007 | Finley | |
| 2007/0153433 A1 | | 7/2007 | Sundquist | |
| 2009/0018703 A1 | | 1/2009 | Mangalam | |
| 2011/0180656 A1 | | 7/2011 | Shue | |
| 2012/0290153 A1 | | 11/2012 | Olsoe | |
| 2013/0306787 A1 | | 11/2013 | Marton et al. | |
| 2014/0288731 A1 | | 9/2014 | Hagerott et al. | |
| 2015/0160658 A1 | * | 6/2015 | Reedman et al. | G05D 1/0088 701/3 |
| 2016/0023755 A1 | | 1/2016 | Elshafei et al. | |

* cited by examiner

*Primary Examiner* — Dale W Hilgendorf
(74) *Attorney, Agent, or Firm* — Van Pelt, Yi & James LLP

(57) ABSTRACT

A set of commands for each of a plurality of actuators to alter an aircraft's state responsive to one or more inputs is produced. The set of commands is provided to fewer than all actuators comprising the plurality of actuators.

20 Claims, 13 Drawing Sheets

DISTRIBUTED FLIGHT CONTROL SYSTEM

BACKGROUND OF THE INVENTION

Automated flight control is indispensable in flying some aircraft. Safety of an automated flight control or autopilot program is critical. An automated flight control system may require a form of redundancy to safeguard against failures. Building redundancy in automated flight control systems may be complex or costly.

BRIEF DESCRIPTION OF THE DRAWINGS

Various embodiments of the invention are disclosed in the following detailed description and the accompanying drawings.

DETAILED DESCRIPTION

Figure 1:
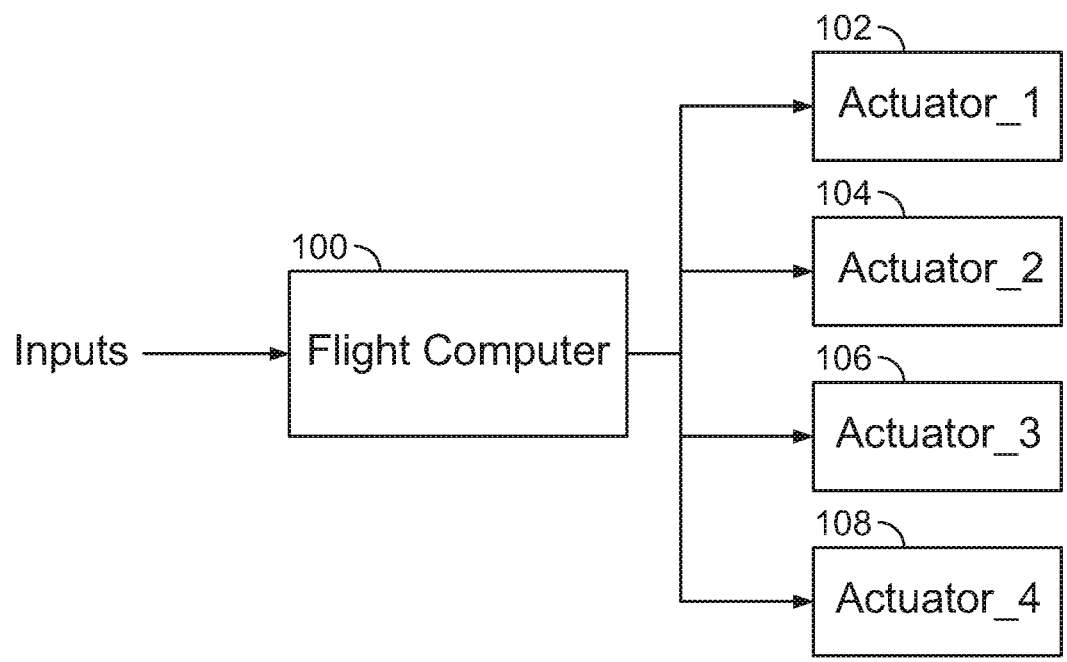
FIG. 1 is a diagram illustrating an embodiment of a non-redundant flight control system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A distributed flight control system is described. The flight control system comprises a processor configured to produce a set of commands for each of a plurality of actuators to alter the state of an aircraft responsive to one or more inputs. The inputs may comprise a desired attitude or rate of attitude change. In some embodiments, the flight control system comprises a set of sensors, and the set of commands are produced responsive to sensor readings. The processor is configured to provide the set of commands to fewer than all actuators comprising the plurality of actuators. In some embodiments, the aircraft comprises a plurality of actuators configured to enable flight in an aircraft in the event zero or one actuators of the multitude of actuators are inactive. The system may comprise a plurality of processors. The system may comprise an equal number of processors and actuators. The processors and actuators may comprise a one to one relationship wherein each actuator receives instructions from a corresponding processor.

An aircraft may be controlled with a degree of automation. A distributed flight control system may comprise one or more flight computers. A flight computer of the one or more flight computers may run auto-pilot software. The flight computer may comprise a processor and a set of sensors. The distributed flight control system may comprise elements of redundancy for safety reasons. For example, the system may be required to be free of any single points of failure. The distributed flight control system may be utilized in an over-actuated aircraft, wherein redundancy is physically built into the aircraft. For example, the aircraft may comprise more actuators than it requires for controllable flight. The distributed flight control system may take advantage of the over-actuated aircraft. The aircraft's physical redundancy may be used to implement flight control system redundancy. Each actuator may be controlled by a separate processor. In some embodiments, each processor considers all actuators and calculates instructions for all actuators but controls only one actuator. The processor may be physically connected to only one actuator. In the event a processor malfunctions, only one actuator of the aircraft may be affected. The distributed flight control system may comprise a simple to implement and redundant autopilot hardware set-up.

FIG. 1 is a diagram illustrating an embodiment of a non-redundant flight control system. The flight computer and actuators depicted may be positioned on a same aircraft. In the example shown, inputs are provided to flight computer 100. Inputs may comprise information collected from instruments on the aircraft. Inputs may comprise signals delivered by a pilot via controls or via an interface. Flight computer 100 may process the inputs and determine instructions for actuators of the aircraft that will put the aircraft on a desired flight trajectory based on the inputs. Flight computer 100 may provide instructions to actuator_1 102, actuator_2 104, actuator_3 106, and actuator_4 108. The actuators may comprise a physical component of the aircraft that affects the aircraft's trajectory. An actuator may comprise a motor, a flap, a pushrod, a control surface, a mechanism, a component that interacts with the physical world, or any appropriate object.

Flight computer 100 may produce instructions for all the actuators. The actuators may be coordinated in order to achieve desired flight. For example, a rotor on a left side of an aircraft and a rotor on a right side of an aircraft may be instructed to rotate in opposite directions in order to prevent rotation of the aircraft. While a non-redundant flight control system is simple to build, it may raise safety concerns. In the event flight computer 100 malfunctions, no back-up system is shown. A single error in flight computer 100 may cause the aircraft to crash.

Figure 2:
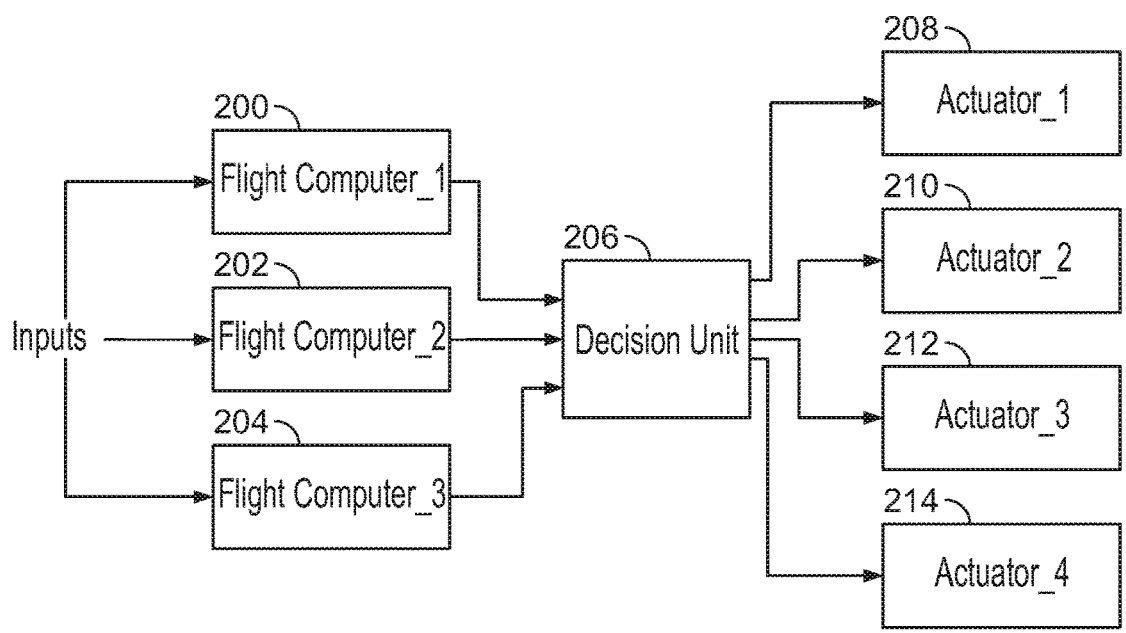
FIG. 2 is a diagram illustrating an embodiment of a triplex redundant flight control system.

FIG. 2 is a diagram illustrating an embodiment of a triplex redundant flight control system. A triplex redundant flight control system uses three flight computers to provide redundancy. In the example shown, inputs are provided to flight computer_1 200, flight computer_2 202, and flight computer_3 204. The flight computers provide information to decision unit 206. The flight computers may each separately determine instructions for all actuators of the aircraft. Decision unit 206 may be used to determine which instructions to provide to the actuators. Decision unit 206 may use a voting scheme. For example, in the event flight computer_1 200 and flight computer_2 202 produced a same instruction for actuator_1 208 but flight computer_3 204 did not, decision unit 206 may pass on the instruction that a majority of the flight computers agreed upon. In the example shown, decision unit 206 provides instructions to actuator_1 208, actuator_2 210, actuator_3 212, and actuator_4 214.

The triplex redundant flight control system may provide redundancy in the aircraft's autopilot and eliminate single points of failure. However, the system may be complex or costly to implement. Decision unit 206 may comprise complex hardware or software. Decision unit 206 may require redundant elements in its hardware or software. The system's hardware or software may be required to be designed from beginning to end with redundancy in mind.

For some aircraft, a non-redundant or a triplex redundant flight control system is not feasible due to cost, complexity, or safety concerns. Some aircraft may exhibit specific characteristics that suit a flight control system based on those characteristics. A distributed flight control system may efficiently utilize physically redundant aircraft.

Figure 3A:
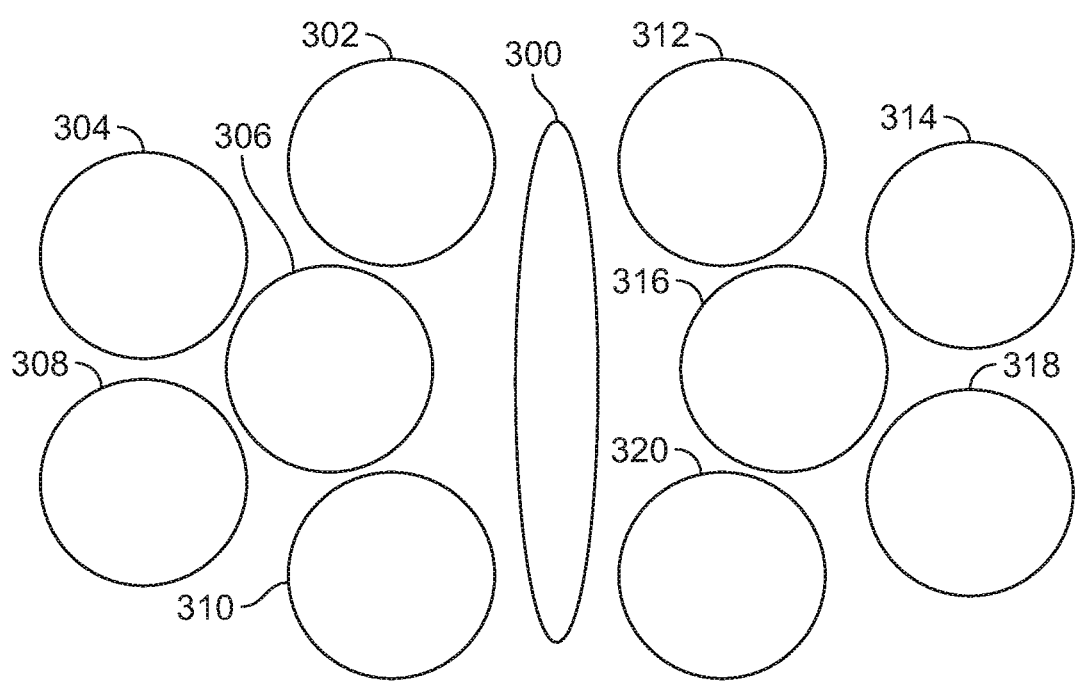
FIG. 3A is a diagram illustrating an embodiment of a multicopter that utilizes a distributed flight control system.

FIG. 3A is a diagram illustrating an embodiment of a multicopter that utilizes a distributed flight control system. In some embodiments, a multicopter is inherently unstable. The multicopter may require active control or an autopilot to prevent the multicopter from flipping. The multicopter may require electronics in its control system opposed to solely mechanical pilot controls. A distributed flight control system may provide a minimum level of autopilot functionality required to allow a pilot to manually fly the multicopter. The system may provide a basic level of autopilot functionality required for the multicopter, comprising attitude control or attitude rate control. With a minimum amount of inputs provided, the distributed flight control system may prevent an aircraft from creating uncontrolled rolling, pitching, or yawing torques. The distributed flight control system may generate proper body torques to keep the multicopter stable. The system may be easily and elegantly utilized in an aircraft such as a multicopter where all actuators are the same (e.g. motors).

The aircraft shown comprises fuselage 300, with five rotors on either side of the fuselage. Rotors 302, 306, 310 and rotors 312, 316, and 320 are positioned adjacent to fuselage 300 on left and right sides of the fuselage, respectively. Rotors 304 and 308 are positioned adjacent to rotors 302, 306, and 310. Rotors 314 and 318 are positioned adjacent to rotors 312, 316, and 320. Outer rotors 304, 308, 314, and 318 may be positioned between two inner rotors, e.g. rotors adjacent to the fuselage. The rotor configuration may allow the multicopter to have a wide wingspan.

Actuators of the multicopter may comprise the rotors. The multicopter may be over-actuated. More rotors than are strictly required to maintain desired flight of the aircraft may be present. For example, the multicopter may achieve acceptable flight performance in the event one of the ten rotors is inactive. The aircraft may be physically redundant such that in the event one rotor is active but is not operating as desired, the aircraft is still able to maintain desired flight. For example, the aircraft will not flip over in the event one rotor is rotating in an undesired direction or at an undesired speed. A physically redundant aircraft may be well-suited for a distributed flight control system.

In some embodiments, in the event one rotor fails, the aircraft is able to detect the failure and turn off an opposite rotor in order to balance torque. In some embodiments, the rotors are not in communication. In some embodiments, cross coupling at the output of the flight computers does not occur. Feedback control algorithms in the flight computers of the distributed flight control system may resolve a rotor failure. The flight computers may detect a position or full attitude of the vehicle. They may determine appropriate motor speeds to achieve a desired attitude. In the event a motor is malfunctioning and a desired position is not achieved, the system may continue to adjust speed or thrust until a correct state is achieved.

The multicopter of FIG. 3A may be designed to have a small form-factor. The multicopter may be flown at low altitudes and low speeds. The multicopter may be designed to be low-cost. In some embodiments, a distributed flight control system is a simple solution made with low-cost parts. The system may be designed for low-cost aircraft.

In some embodiments, the distributed flight control system is used in an unmanned aircraft. For example, the multicopter shown may be fully autonomous. In some embodiments, the distributed flight control system is used in a manned aircraft.

Figure 3B:
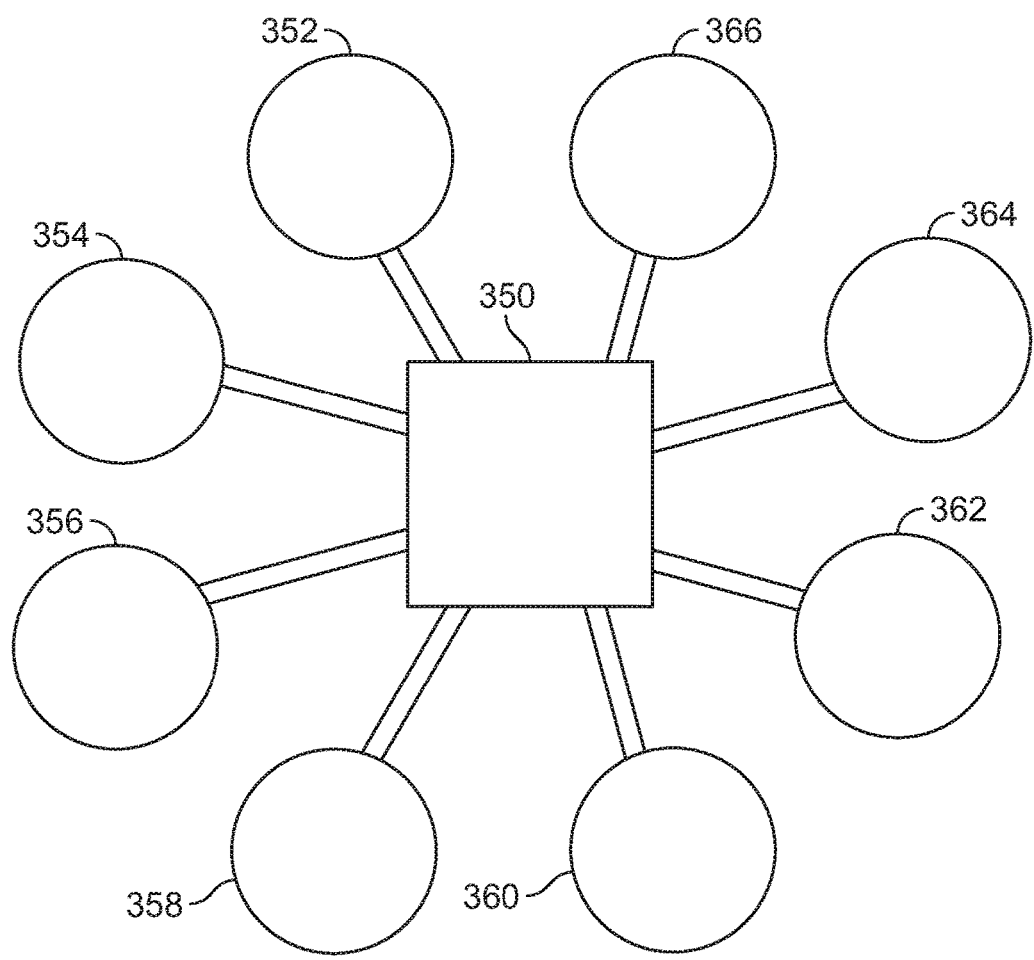
FIG. 3B is a diagram illustrating an embodiment of a multicopter that utilizes a distributed flight control system.

FIG. 3B is a diagram illustrating an embodiment of a multicopter that utilizes a distributed flight control system. In the example shown, the multicopter comprises fuselage 350 and rotors 352, 354, 356, 358, 360, 362, 364 and 366. The eight rotors are arranged around fuselage 350. The rotors may be attached via booms or beams. The distributed flight control system may be used in a standard multicopter. The distributed flight control system may be used in a standard aircraft. For example, the system may be used in an aircraft that comprises two wings.

Figure 4:
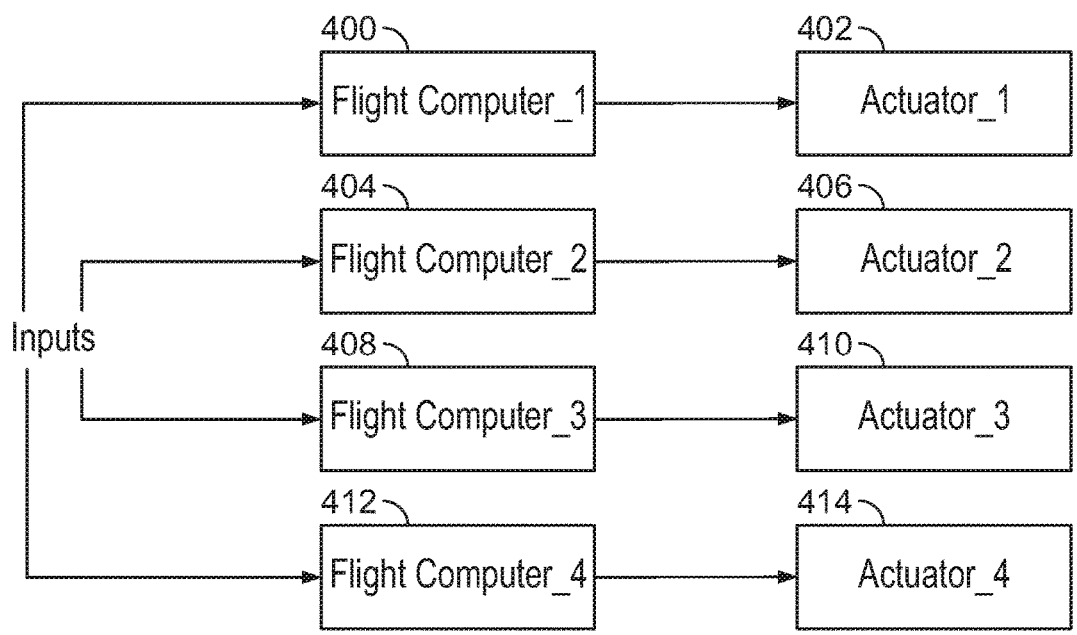
FIG. 4 is a diagram illustrating an embodiment of a distributed flight control system.

FIG. 4 is a diagram illustrating an embodiment of a distributed flight control system. In the example shown, inputs are provided to flight computer_1 400, flight computer_2 404, flight computer_3 408, and flight computer_4 412. Inputs may comprise desired attitudes or desired attitude rates. The inputs may be sourced from pilot controls or from a higher level flight computer.

Flight computer_1 400 provides inputs to actuator_1 402. Flight computer_2 404 provides inputs to actuator_2 406. Flight computer_3 408 provides inputs to actuator_3 410. Flight computer_4 412 provides inputs to actuator_4 414. In some embodiments, a flight computer exists for each actuator of the aircraft. Each flight computer may be unaware of other flight computers. Each flight computer may act as though it is the only flight computer present in the system. The flight computers may be decoupled from each other, with no communication among them. All flight computers of the system may be identical. They may comprise identical hardware and software. The flight computers may comprise a processor, a set of sensors, and computer algorithms. The set of sensors may comprise a rate gyro, accelerometer, or magnetometer. In some embodiments, the flight computer is a board comprising several integrated circuits. For example, one integrated circuit may function as a microprocessor, whereas another functions as an accelerometer. Each flight computer may determine instructions for all actuators of the aircraft. The flight computer may determine instructions based on its inputs (e.g. desired attitude or desired attitude rate) and collected sensor data. The flight computer may determine instructions for the actuators to achieve the desired attitude or attitude rate while keeping the aircraft balanced. For example, a multicopter may be inherently unstable and require a torque control loop that the flight computer puts into place. Each flight computer may run a feedback control loop.

In some embodiments, each flight computer is physically connected to only one actuator. An actuator corresponding to the flight computer may receive only the instruction applying to said actuator. In some embodiments, an actuator of the aircraft is decoupled from other actuators. The actuators may not be in communication. In some embodiments, a flight computer provides instructions for all actuators to the actuator it is physically connected to. The actuator may utilize the correct instruction based on the actuator's position.

In some embodiments, the distributed flight control system enables use of flight computers that are simple to build or program. The computers may comprise low cost processors. Wiring of the distributed flight control system may be simple due to decoupled flight computers. In the event an error occurs in a single flight computer, only its singular corresponding actuator may be affected. Due to a physically redundant aircraft, a flight trajectory of the aircraft may proceed as desired in the event an actuator malfunctions. Using a separate flight computer for each actuator may allow a failure in the flight computer to percolate to the actuator level, where it is resolved. An error occurring in a flight computer or speed controller may result in undesired behavior in a singular corresponding actuator of an aircraft. In an over-actuated aircraft, the undesired behavior of the actuator does not significantly affect the aircraft's flight trajectory.

Figure 5:
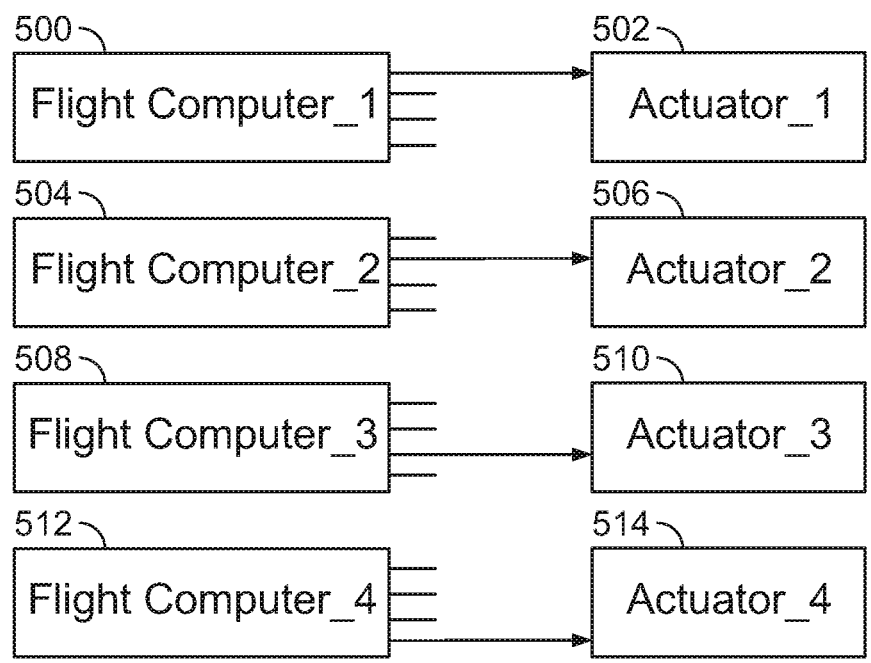
FIG. 5 is a diagram illustrating an embodiment of connection in a distributed flight control system.

FIG. 5 is a diagram illustrating an embodiment of connection in a distributed flight control system. In some embodiments, the wiring or wiring harness used in the flight control system causes a flight computer to provide instructions to a subset of actuators available in the aircraft. In the example shown, four actuators are present. The distributed flight control system may be positioned on an aircraft with four actuators. In the example shown, flight computer_1 500, flight computer_2 504, flight computer_3 508, and flight computer_4 512 each produce four outputs. The outputs may be instructions for each actuator in the aircraft. Each flight computer may determine instructions for all actuators, wherein each actuator's instructions are provided on a different wire. Each flight computer may have one or more wires that are not connected to actuators and the outputs are not used. For example, each flight computer has one actuator instruction output wire that is connected to an actuator while all other actuator instruction output wires from the flight computer are not connected to any actuator. As shown, flight computer_1 500 is physically connected to actuator_1 502 and no other actuators. Flight computer_2 504 is physically connected to actuator_2 506 and no other actuators. Flight computer_3 508 is physically connected to actuator_3 510 and no other actuators. Flight computer_4 512 is physically connected to actuator_4 514 and no other actuators.

Figure 6:
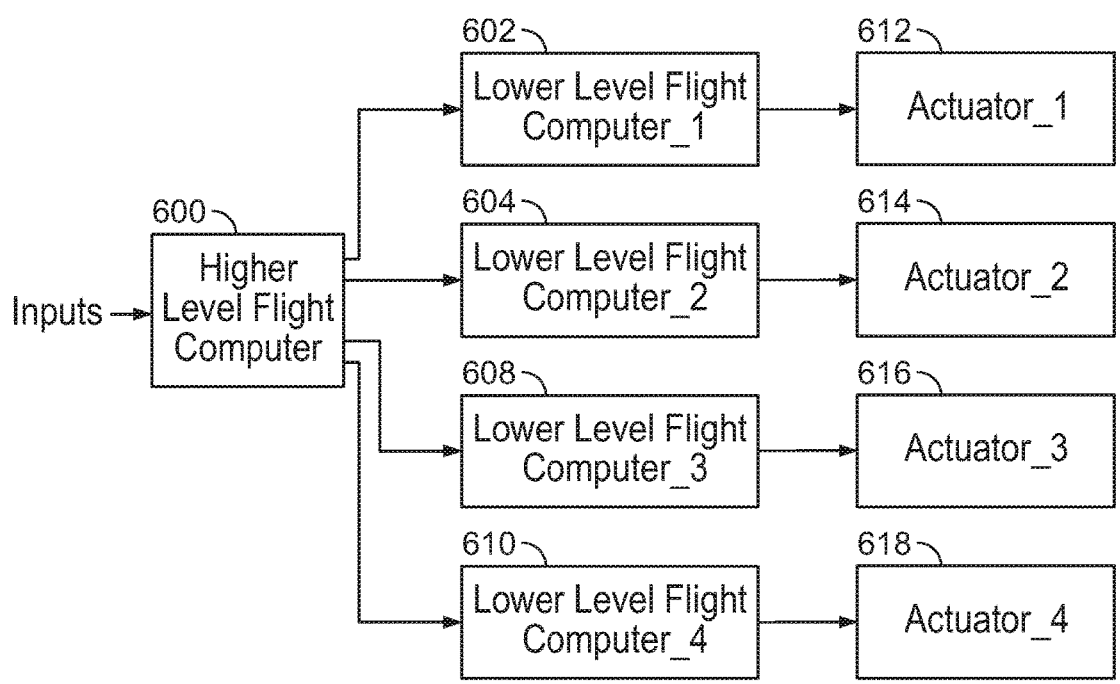
FIG. 6 is a diagram illustrating an embodiment of a distributed flight control system.

FIG. 6 is a diagram illustrating an embodiment of a distributed flight control system. In some embodiments, the distributed flight control system has multiple levels of flight computers. Higher level flight computers may reduce complex instructions into a set of simple commands that are then provided to lower level flight computers. The higher level flight computer may control the position and velocity of the aircraft while lower level flight computers control the attitude of the aircraft. The actuators may receive instruction from lower level flight computers. In the example shown, inputs are provided to higher level flight computer 600.

Inputs may comprise an input from a user interface. For example, a pilot may enter a latitude and longitude. Inputs may comprise conditions, such as a stipulation to avoid locations with bad weather, fly over areas of low population density, or to take the shortest path. The inputs may comprise an instruction to execute a complex flight trajectory. The higher level flight computer may determine an appropriate velocity or position for the aircraft based on the inputs. The higher level flight computer may automatically navigate or control the aircraft to achieve the desired velocity or position. The higher level flight computer may determine a desired attitude or desired rate of attitude change based on the inputs and provide the desired attitude or desired rate of attitude change to lower level flight computers. Higher level flight computer 600 determines instructions given to lower level flight computer_1 602, lower level flight computer_2 604, lower level flight computer_3 608, and lower level flight computer_4 610.

Lower level flight computer_1 602 as shown provides inputs to actuator_1 612. Lower level flight computer_2 604 provides inputs to actuator_2 614. Lower level flight computer_3 608 provides inputs to actuator_3 616. Lower level flight computer_4 610 provides inputs to actuator_4 618. The lower level flight computers may determine a speed for a rotor, a tilt angle of a flap, an amount of thrust used, or any other appropriate factor. The lower level flight computers may perform full feedback control. For example, the lower level flight computer may determine an actual attitude or attitude rate of the aircraft and compare to a desired attitude or attitude rate of the aircraft. The lower level flight computer may then determine instructions to lower the difference between the two values, if one exists. An aircraft may comprise 2, 10, 22, or any appropriate number of actuators. The aircraft may comprise an equal number of lower level flight computers.

Figure 7:
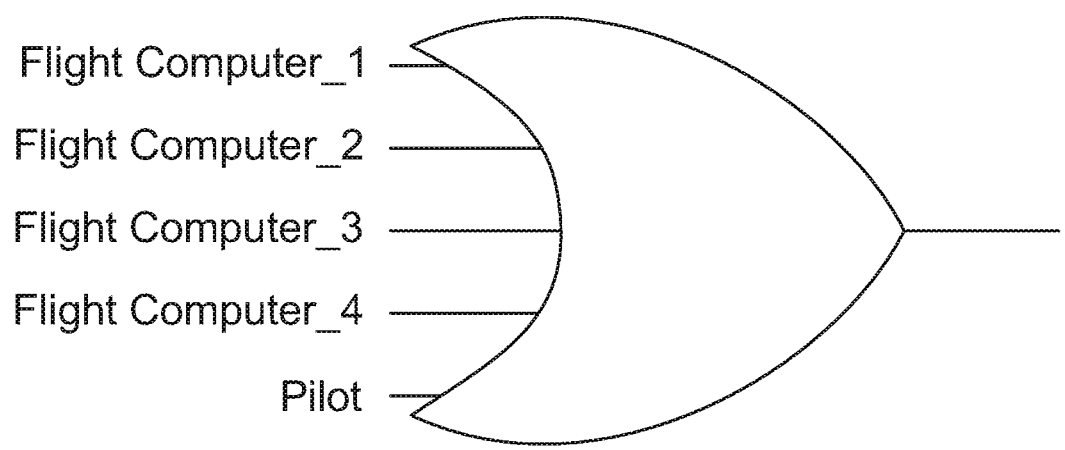
FIG. 7 is a diagram illustrating an embodiment of a mode-switch mechanism of a distributed flight control system.

FIG. 7 is a diagram illustrating an embodiment of a mode-switch mechanism of a distributed flight control system. In some embodiments, lower level flight computers have an option to be controlled by a higher level flight computer or to be controlled manually, e.g. by a pilot. The lower level flight computers may constantly calculate actuator actions in order to maintain a base level of flight. They may further factor in instructions given by a higher level flight computer or pilot directing the aircraft's flight trajectory. The flight computers may each comprise independent code or hardware to determine when to switch from listening to a higher level flight computer to listening to manual control. Control may be desired to switch over to a manual mode in the event a malfunction is detected in the higher level flight computer or an irregularity is detected. In some embodiments, the aircraft's actual state is tracked and compared to the aircraft's desired state. In the event the actual state does not track the desired state appropriately, the system may signal that a malfunction is detected. A pilot's controls may comprise a switch, button, application, or other mechanism to select a mode.

In some embodiments, lower level flight computers of the system are identical. However, each lower level flight computer may comprise its own set of sensors. The computer may use sensor data to determine whether a mode switch is required. Different lower level flight computers may comprise sensors of different specifications. The lower level flight computers may be positioned in varying places on the aircraft, causing sensor data to vary. Without linking the flight computers, they may determine to switch modes at different times.

In the event one lower level flight computer switches from listening to a higher level computer to listening to a pilot line, all flight computers may be switched at once. Maintaining the same mode for all flight computers may allow actuators of the aircraft to fly the aircraft effectively. In some embodiments, the flight computers of a distributed flight control system are in communication. The flight computers and pilot line may communicate over a bus or communication network to coordinate switching. The flight computers and pilot line may be electrically connected via logic gates. In the example shown, flight computer_1, flight computer_2, flight computer_3, flight computer_4, and a pilot are inputs to an OR gate. In some embodiments, the flight computers and pilot are inputs to a series of OR gates wherein each OR gate has two inputs. In some embodiments, the communication line reads as "low" or is below a predetermined voltage threshold when the aircraft is in one mode. In the event a flight computer or the pilot switches modes, the flight computer or pilot's signal may go "high" or be above a predetermined voltage threshold. Pulling one of the signals high may cause the entire communication line to be pulled high, changing the mode for all flight computers and the pilot.

Figure 8:
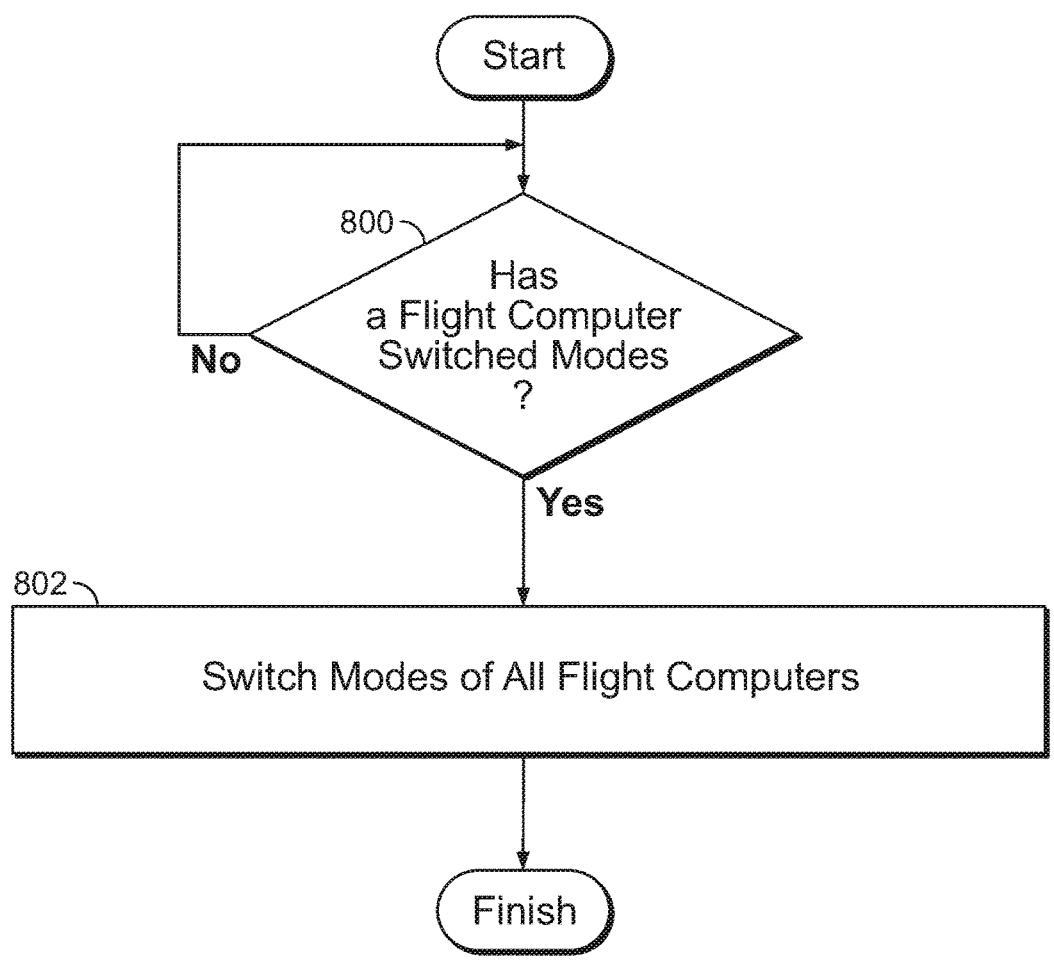
FIG. 8 is a flow diagram illustrating an embodiment of a mode switch decision process.

FIG. 8 is a flow diagram illustrating an embodiment of a mode switch decision process. In 800, it is determined whether a flight computer has switched modes. The process may check to see if any flight computer of the system's lower level flight computers has switched modes. In the event no flight computers have switched modes, the process repeats 800. In some embodiments, the process pauses for a predetermined period of time before repeating 800. In the event a flight computer has switched modes, in 802 modes of all the flight computers are switched.

In some embodiments, in 800 it is determined whether a flight computer has switched modes or if an indication to switch modes is received. An indication to switch modes may be received by a pilot or a higher level flight computer. For example, a higher level flight computer may automatically switch the lower level flight computers from automatic to manual mode in the event the higher level flight computer detects that the higher level flight computer is compromised. The mode may be automatically switched from manual to higher level flight computer mode in the event no signals are received from a pilot's aircraft controls for a period of time.

Figure 9:
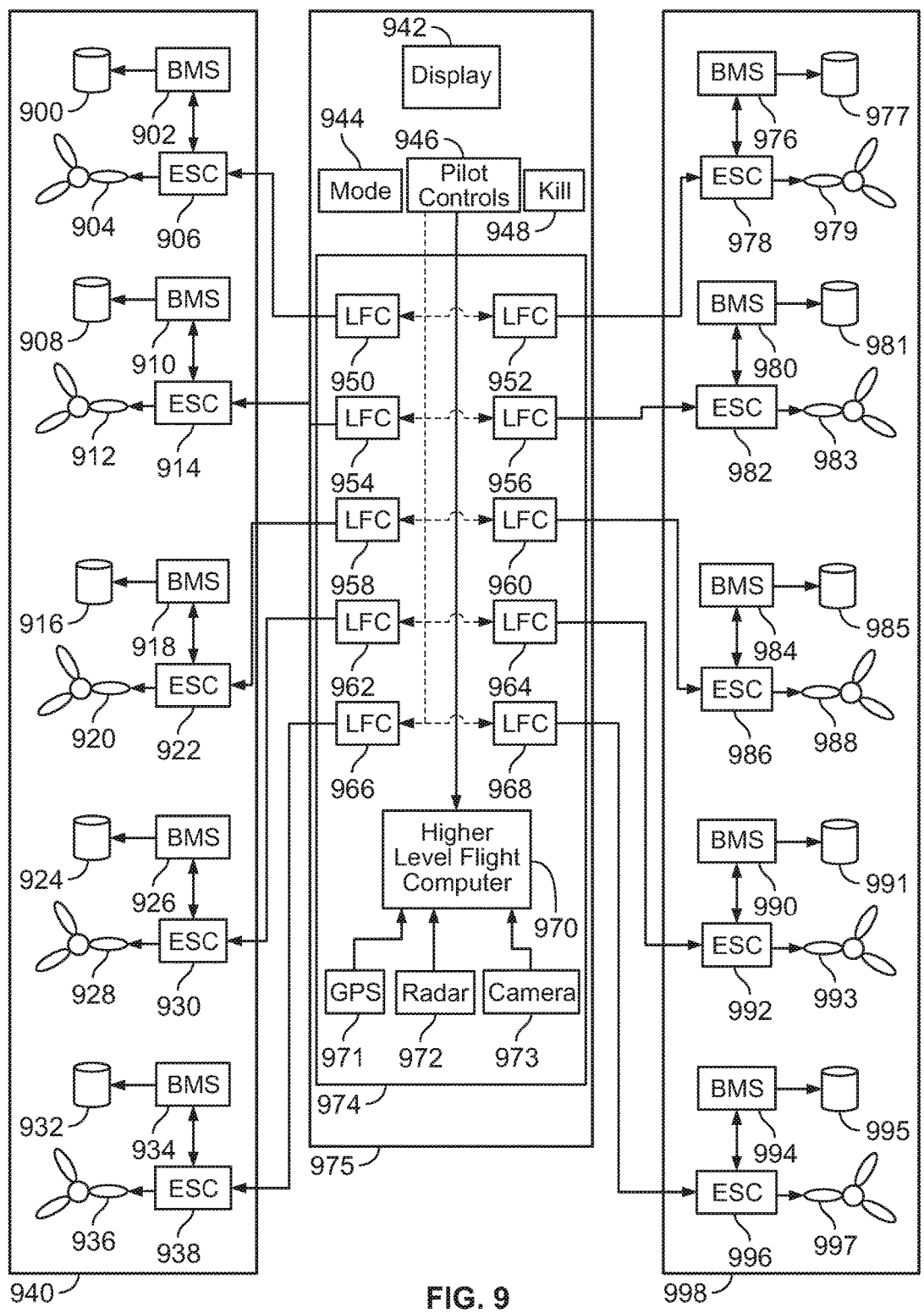
FIG. 9 is a diagram illustrating an embodiment of a distributed flight control system in an aircraft.

FIG. 9 is a diagram illustrating an embodiment of a distributed flight control system in an aircraft. In some embodiments, the system may be utilized by an aircraft that comprises two booms and a fuselage. The system may be used on a multicopter comprimising rotors that are installed on the two booms. The multicopter of FIG. 3 may be positioned over two booms or pontoons. The booms may be inflatable or lightweight and enable the aircraft to land on water. A pilot may be situated in the fuselage.

In the example shown, major elements of the distributed flight control system are stored on fuselage 975. Masterboard 974 is situated on fuselage 975. Masterboard 974 may act as a backplane. Lower level flight computers of the system may be laid out on a shared circuit board. Lower level flight computers may plug into the masterboard. In the example shown, lower level flight computers 950, 954, 958, 962, 966, 952, 956, 960, 964, and 968 are installed on masterboard 974. The lower level flight computers may be electrically isolated from each other. They may plug into separate power sources. The lower level flight computers may be microcontrollers with a set of sensors. The sensors may comprise typical smart phone sensors, such as a magnetometer, rate gyro, or accelerometer. The lower level flight computers may be installed in a center of the aircraft in the fuselage in order to collect accurate data from their sensors. Higher level flight computer 970 is also installed on masterboard 974. Global positioning system 971, radar 972, and camera 973 are also installed on masterboard 974 and provide data to higher level flight computer 970. Camera 973 may comprise a stereo camera or infrared camera. Other sensors such as lidar or sonar may also provide data to the masterboard.

In the example shown, display 942 is present on the fuselage. The display may provide flight information to a pilot of the aircraft. The display may enable the pilot to control the aircraft, for example via a touch screen. Mode switch 944, pilot controls 946, and kill switch 948 are also present on the fuselage. Mode switch 944 may comprise a button, switch, or other control that enables a pilot to switch between manual mode and higher level flight computer automatic mode. Kill switch 948 may allow the pilot to disable power to all actuators of the aircraft, such as all the rotors. Pilot controls 946 may comprise one or more physical objects the pilot manipulates to adjust the aircraft's position. For example, a joystick, steering wheel, pedal, lever, or any other appropriate control may be used. In some embodiments, a boot button may exist. The boot button may be used to power on the system. The power up and power down mechanisms may be physically separate in order to decrease chances of triggering the incorrect action.

In the example shown, higher level flight computer 970 receives inputs from pilot controls and sensors. The higher level flight computer may provide instruction to the lower flight computer based on the pilot controls and sensor information. For example, in the event a pilot abruptly changes a direction of the aircraft while it is engaged in automatic mode, the higher level flight computer may immediately allow the pilot control input to override a prior path of the aircraft.

In some embodiments, a lower level flight computer is connected to a rotor. The lower level flight computer may be powered by a battery that also powers the rotor. The battery may be isolated from other rotors or flight computers. In the example shown, lower flight computer 952 provides inputs to electronic speed controller 978. Electronic speed controller 978 is connected to rotor 979. The electronic speed controller may determine how fast the rotor spins. Electronic speed controller 978 may be in communication with battery management system 976 which manages battery 977. The controller and battery management system may share an analog connection. Increasing rotor speed may comprise using more battery power.

In the example shown, lower flight computers 952, 956, 960, 964, and 968 control five rotors positioned on right boom 998. Lower flight computer 956 controls electronic speed controller 982, which controls rotor 983. Battery 981 is managed by battery management system 980. Battery 981 powers rotor 983 and lower flight computer 956. Lower flight computer 960 corresponds to electronic speed controller 986, rotor 988, battery management system 984, and battery 985. Lower flight computer 964 corresponds to electronic speed controller 992, rotor 993, battery management system 990, and battery 991. Lower flight computer 968 corresponds to electronic speed controller 996, rotor 997, battery management system 994, and battery 995.

In the example shown, lower flight computers 950, 954, 958, 962, and 966 control five rotors positioned on left boom 940. Lower flight computer 950 controls electronic speed controller 906, which controls rotor 904. Battery 900 is managed by battery management system 902. Battery 900 powers rotor 904 and lower flight computer 950. Lower flight computer 954 corresponds to electronic speed controller 914, rotor 912, battery management system 910, and battery 908. Lower flight computer 958 corresponds to electronic speed controller 922, rotor 920, battery management system 918, and battery 916. Lower flight computer 962 corresponds to electronic speed controller 930, rotor 928, battery management system 926, and battery 924. Lower flight computer 966 corresponds to electronic speed controller 938, rotor 936, battery management system 934, and battery 932.

In some embodiments, each lower level flight computer is connected to an electronic speed controller via a serial connection. Each lower level flight computer may have a separate serial connection that is isolated from other connections in the flight control system. For example, a short in one serial connection between one lower level flight computer and one electronic speed controller may have no effect on other lower level flight computers or other electronic speed controllers in the flight control system.

Pilot controls 946 may be connected to higher level flight computer 970 via an analog connection. In some embodiments, pilot control inputs may be first inputted to the higher level flight computer while in manual mode. The higher level flight computer may enhance the pilot instructions before commands are given to the lower level flight computers. For example, a pilot may let go of all pilot controls when the aircraft is desired to remain motionless in its current position. The higher level flight controller may perform altitude control and prevent the aircraft from drifting in position. Using the higher level flight controller during manual mode may allow the aircraft's position to be more accurately controlled. However, the distributed flight control may enable pilot inputs to be directly provided to lower level flight computers. As shown, the pilot controls are additionally separately connected to the lower level flight computers. In the event the higher level flight computer fails, a pilot is able to directly provide inputs to the lower level flight computers.

Electronic speed controllers and battery management systems of the distributed flight control system may be connected via Ethernet. In some embodiments, the electronic speed controllers and battery management systems provide information over the Ethernet network regarding a state of a battery, an amount of heat being produced, or any other appropriate information. The lower level flight computers may also be part of the network. The components may plug into an Ethernet switch. A WI-FI radio may be connected to the Ethernet network and provide information on components of the distributed flight control system to the pilot or to ground.

Figure 10:
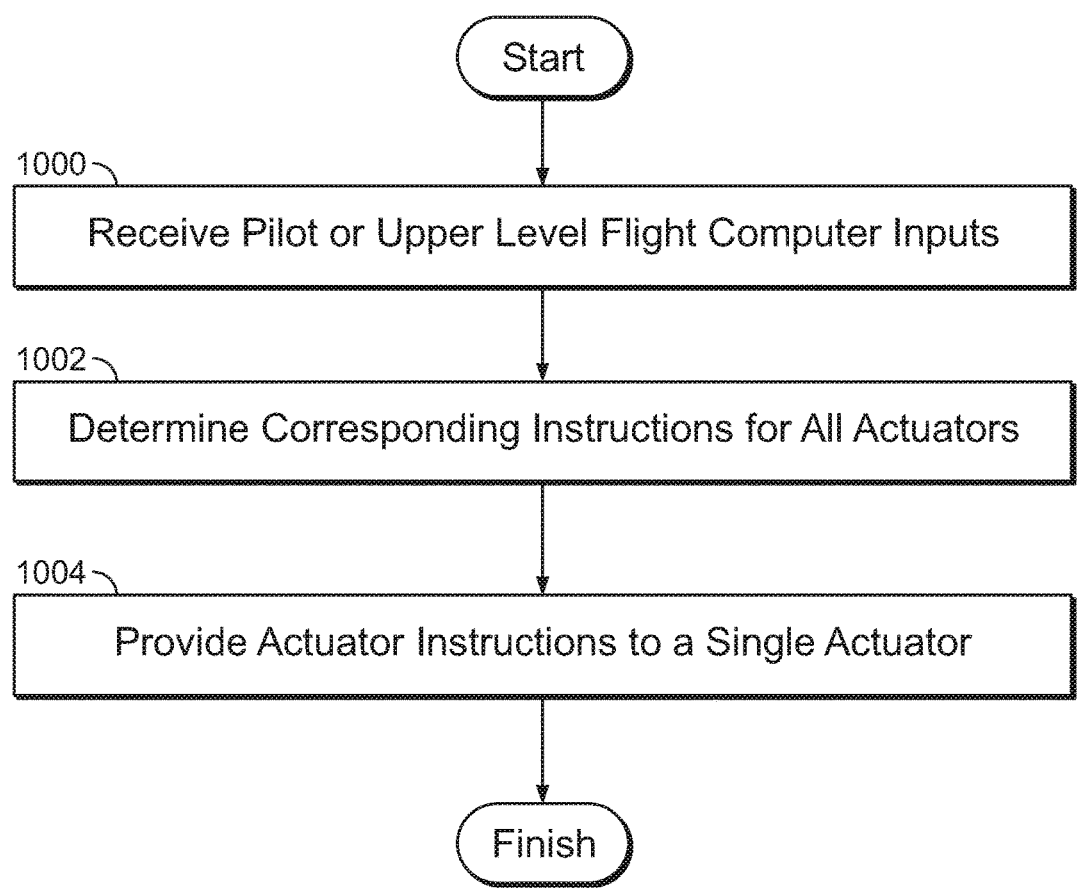
FIG. 10 is a flow diagram illustrating a distributed flight control system process.

FIG. 10 is a flow diagram illustrating a distributed flight control system process. The process may be performed by a single lower level flight computer of the system. In 1000, pilot or upper level flight computer inputs are received. In 1002, corresponding instructions for all actuators are determined. The lower level flight computer may determine a position or action for all actuators of the aircraft to accomplish instructions received and also maintain desired base levels of flight. In 1004, actuator instructions are provided to a single actuator. The lower level flight computer may be physically connected to only one actuator.

Figure 11:
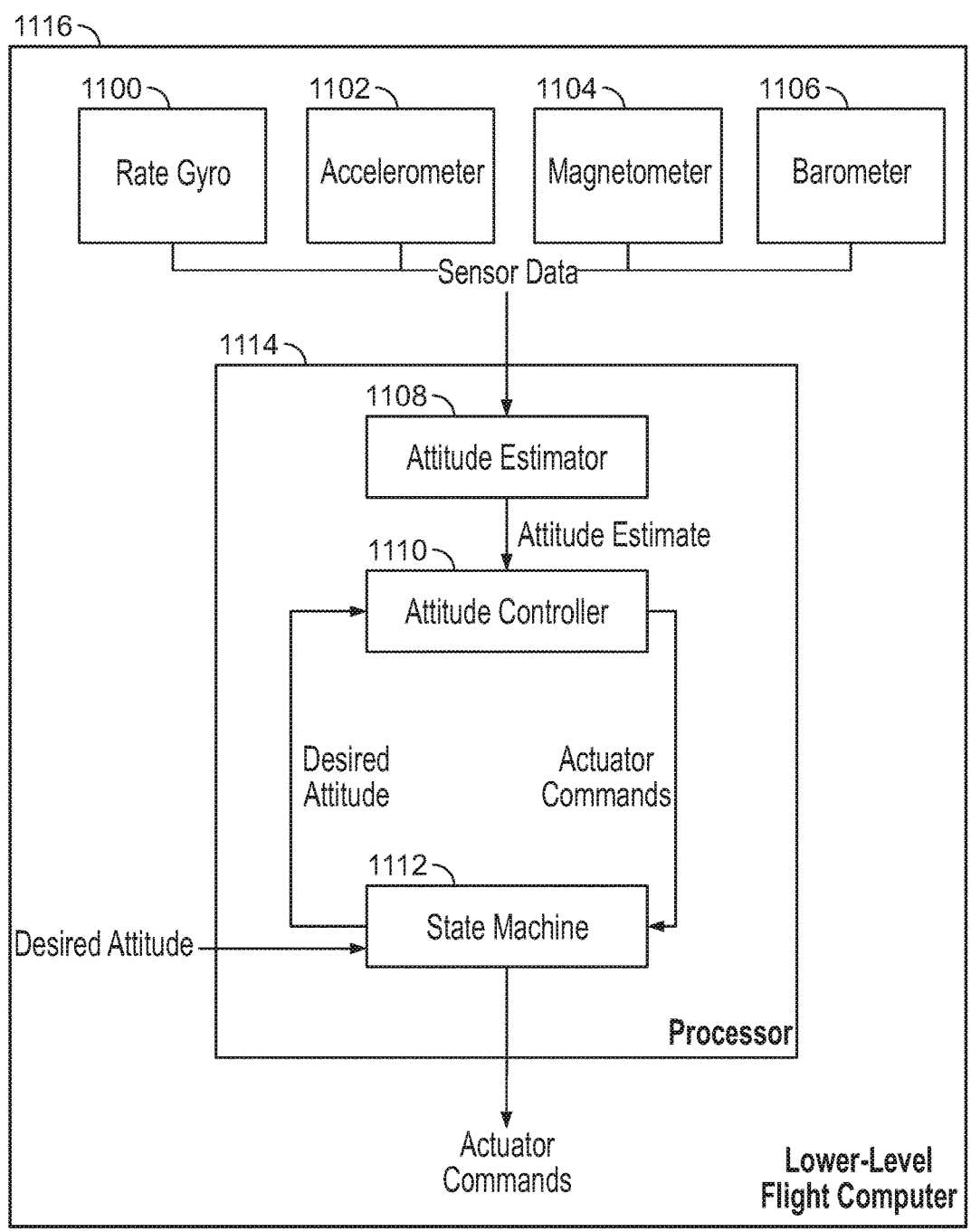
FIG. 11 is a diagram illustrating an embodiment of flight computer of a distributed flight control system.

FIG. 11 is a diagram illustrating an embodiment of flight computer of a distributed flight control system. Lower-level flight computer 1116 comprises a set of sensors and processor 1114. In the example shown, rate gyro 1100, accelerometer 1102, magnetometer 1104, and barometer 1106 provide sensor data to processor 1114. The processor may comprise a microcontroller. Processor 1114 comprises attitude estimator 1108, attitude controller 1110, and state machine 1112. As shown, sensor data is provided to attitude estimator 1108.

The attitude estimator may determine an approximate actual attitude of the aircraft based on the sensor data provided. The attitude estimate is provided to attitude controller 1110. As shown, attitude controller 1110 receives a desired attitude from state machine 1112. Attitude controller 1110 may determine whether a difference exists between the desired attitude and the attitude estimate. The attitude controller may determine actuator commands intended to change the actual attitude of the aircraft to match the desired attitude. Attitude controller 1110 provides actuator commands to state machine 1112.

State machine 1112 receives a desired attitude and actuator commands. The desired attitude may be provided by a pilot or a higher level flight computer. The state machine may determine which desired attitude to provide to the attitude controller. For example, the state machine may ignore inputs from a pilot in the event the flight control system to set to an automatic mode wherein the higher level flight computer is in control. State machine 1112 outputs actuator commands for the aircraft. In some embodiments, state machine 1112 acts as a process control mechanism. For example, the state machine may prevent actuator commands from being sent in the event the aircraft is on land and flight control should not be engaged. Commands provided may vary for different types of actuators based on the aircraft. For example, motor commands may be provided for a multicopter.

In some embodiments, data is collected by processor 1114 and provided to a higher level flight computer. The data may comprise sensor data or position data. The data may be used for logging. In some embodiments, an actuator of the aircraft may be in communication with a higher level flight computer of the system. The actuator may report on its health. The system may use actuator health information to compensate for a disabled or malfunctioning actuator with other actuators. Reporting back a status may enable the aircraft to adjust to a failure faster than a default tactic of iterating. By default, the system may iterate and continually adjust instructions to the actuators until a desired flight position or trajectory is achieved.

Figure 12:
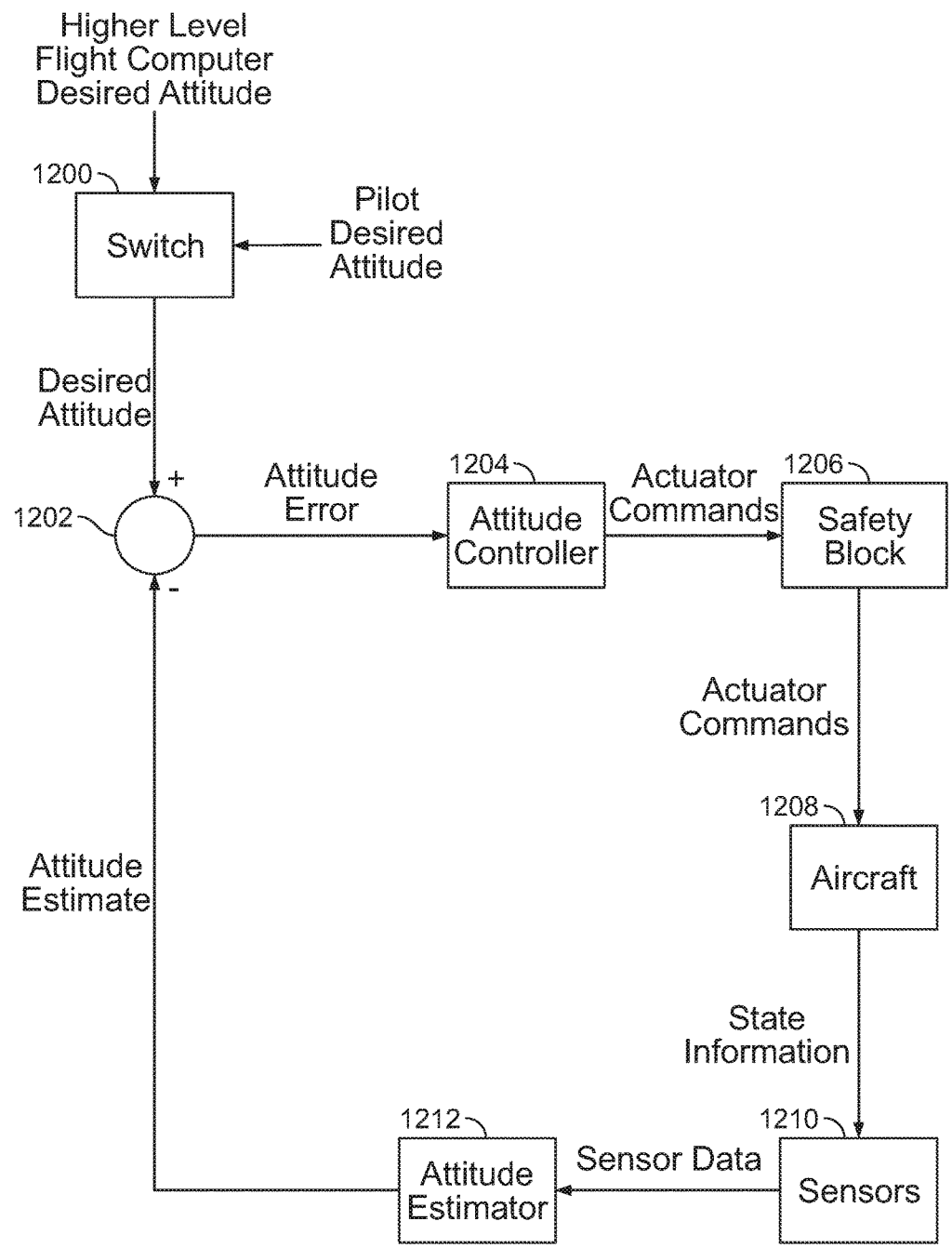
FIG. 12 is a diagram illustrating an embodiment of distributed flight control system flow.

FIG. 12 is a diagram illustrating an embodiment of distributed flight control system flow. In the example shown, switch 1200 receives a higher level flight computer desired attitude and a pilot desired attitude. Switch 1200 may determine on desired attitude to pass on to summation block 1202 based on whether the flight control system is in manual mode or automatic mode. Summation block 1202 may receive a desired attitude and an attitude estimate and determine an attitude error, or difference between the two. The attitude estimate may be an estimate of the aircraft's actual attitude. Attitude controller 1204 as shown receives the attitude error and produces actuator commands for the aircraft based on the attitude error. The commands may be determined to eliminate the attitude error. Actuator commands are provided to safety block 1206. Safety block 1206 may prevent commands from being sent to actuators in the event the aircraft is already landed, in a take-off sequence, or in a landing sequence. In the event the aircraft is prepared to receive actuator commands, actuator commands are provided by the safety block to aircraft 1208. The aircraft's actuators may provide information on their state to sensors 1210. For example, a signal may be sent that the actuators changed position. In some embodiments, the aircraft's actuators change position based on received commands and the sensors detect the change in position. Information may not be explicitly sent from the aircraft to sensors. Sensors 1210 provide sensor data to attitude estimator 1212. Attitude estimator 1212 may process the sensor data received. For example, the attitude estimator may disregard signal noise. Attitude estimator 1212 may determine an estimate of the aircraft's attitude based on the sensor data. Attitude estimator 1212 may provide an attitude estimate to 1202. In some embodiments, switch 1200 and safety block 1206 are executed by one software block, for example, a state machine.

In some embodiments, the number of lower level flight computers may be less than the number of actuators. For example, each lower level flight computer may control two rotors of a multicopter. The two rotors may be opposite each other. In the event a lower level flight computer fails, the aircraft may experience negligible negative effects because the aircraft remains balanced.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A flight control system, comprising:
   a plurality of flight computers, each comprising a processor configured to:
   receive one or more inputs; and
   produce a set of commands for each of a plurality of actuators to alter an aircraft's state responsive to said one or more inputs, the set of commands produced by each of at least a subset of flight computers in the plurality of flight computers including a first command for a first actuator included in said plurality of actuators and a second command for a second actuator included in said plurality of actuators;
   wherein a first flight computer in said at least a subset of flight computers is configured to provide the first command to the first actuator but not to provide the second command to the second actuator; a second flight control computer in said at least a subset of flight computers is configured to provide the second command to the second actuator but not to provide the first command to the first actuator; and each of said plurality of flight computers is configured to determine instructions for all actuators in the plurality of actuators and is communicatively decoupled from other ones of said plurality of flight computers; and
   wherein each of the plurality of flight computers is configured to control directly and individually a respective actuator of the plurality of actuators.

2. The system of claim 1, wherein the processor has a corresponding set of sensors.

3. The system of claim 1, wherein the processor has a corresponding set of sensors and the set of commands are produced responsive to sensor data from the set of sensors.

4. The system of claim 1, wherein the processor has a corresponding set of sensors comprising a rate gyro, accelerometer, magnetometer, or barometer.

5. The system of claim 1, wherein the plurality of actuators are configured to enable flight in the aircraft in the event zero or one actuators of the plurality of actuators are inactive.

6. The system of claim 1, wherein the processor is physically connected to only one actuator.

7. The system of claim 1, comprising one or more additional processors configured to produce a set of commands for the plurality of actuators and provide the set of commands to fewer than all actuators comprising the plurality of actuators.

8. The system of claim 7, comprising an equal number of processors and actuators.

9. The system of claim 7, wherein the processors are electrically isolated.

10. The system of claim 1, wherein an actuator of the plurality of actuators receives commands from only one corresponding processor.

11. The system of claim 1, wherein the processor provides basic autopilot capabilities.

12. The system of claim 1, wherein the processor performs attitude control and attitude rate control.

13. The system of claim 12, wherein the processor receives inputs from a pilot.

14. The system of claim 12, wherein the processor receives inputs from a processor configured to handle high level flight instructions.

15. The system of claim 1, wherein the processor is able to switch between an automatic mode and a pilot control mode.

16. The system of claim 15, wherein the processor receives inputs from a higher level processor in the automatic mode and receives inputs from pilot controls in pilot control mode.

17. The system of claim 16, wherein an actuator of the plurality of actuators reports a status to the higher level processor.

18. The system of claim 15, wherein the processor and one or more additional processors are configured to switch modes based on pilot indication.

19. The system of claim 1, wherein the aircraft comprises a multicopter.

20. A flight control system, comprising:
    a plurality of flight computers, each comprising a processor configured to:
    receive one or more inputs; and
    produce a set of commands for each of a plurality of actuators to alter an aircraft's state responsive to said one or more inputs;
    wherein a first flight computer in said at least a subset of flight computers is configured to provide the first command to the first actuator but not to provide the second command to the second actuator; and each of said plurality of flight computers is configured to determine instructions for all actuators in the plurality of actuators and is communicatively decoupled from other ones of said plurality of flight computers; and wherein each of the plurality of flight computers is configured to control directly and individually a respective actuator of the plurality of actuators.

\* \* \* \* \*